(12) United States Patent
Momsen et al.

(10) Patent No.: US 8,104,645 B2
(45) Date of Patent: Jan. 31, 2012

(54) DEVICE FOR DISCHARGING GRANULAR MATERIAL

(75) Inventors: Jan Momsen, Flensburg (DE); Norbert Peters, Flensburg (DE); Timm Kirchhoff, Westernholz (DE); Arne Haase, Harrislee (DE)

(73) Assignee: Krones AG (DE)

( * ) Notice: Subject to any disclaimer, the term of this patent is extended or adjusted under 35 U.S.C. 154(b) by 628 days.

(21) Appl. No.: 12/288,270

(22) Filed: Oct. 17, 2008

(65) Prior Publication Data

US 2009/0107894 A1 Apr. 30, 2009

(30) Foreign Application Priority Data

Oct. 18, 2007 (DE) .......................... 10 2007 050 315

(51) Int. Cl.
*G01F 11/20* (2006.01)
(52) U.S. Cl. ....... 222/239; 222/1; 222/167; 222/189.05; 222/333; 222/452; 209/358
(58) Field of Classification Search ...... 222/1, 236–237, 222/239–241, 189.05, 333, 366, 367, 370, 222/166–168, 452; 209/358, 271, 240–241
See application file for complete search history.

(56) References Cited

U.S. PATENT DOCUMENTS

| | | | |
|---|---|---|---|
| 1,668,825 A | 5/1928 | Sobek | |
| 2,592,676 A * | 4/1952 | Franklin | 209/283 |
| 2,672,075 A * | 3/1954 | Fraser | 241/43 |
| 2,877,937 A * | 3/1959 | Weir | 222/452 |
| 3,260,415 A * | 7/1966 | Kozo et al. | 222/162 |
| 3,893,592 A * | 7/1975 | Friedman | 222/14 |
| 4,326,651 A | 4/1982 | Sabase et al. | |
| 4,543,181 A * | 9/1985 | Greenwood | 209/273 |
| 4,913,320 A * | 4/1990 | Stazhevsky et al. | 222/168 |
| 5,360,141 A | 11/1994 | Scatizzi | |
| 6,730,774 B1 | 5/2004 | Christel et al. | 528/500 |

FOREIGN PATENT DOCUMENTS

| | | |
|---|---|---|
| DE | 24 00 547 | 7/1975 |
| DE | 25 19 773 | 11/1976 |
| DE | 30 25 049 | 2/1981 |
| DE | 39 42 558 | 6/1991 |
| DE | 199 53 659 | 5/2001 |
| EP | 0 254 953 | 7/1987 |
| JP | 58-89523 | 5/1983 |
| JP | 61-18642 | 1/1986 |

OTHER PUBLICATIONS

EPO Search Report dated Feb. 5, 2009.

* cited by examiner

*Primary Examiner* — Frederick C. Nicolas
(74) *Attorney, Agent, or Firm* — Hayes Soloway P.C.

(57) ABSTRACT

A device for discharging granular material, has a receptacle into which the granular material may be introduced, with a separation grid, which is disposed in the receptacle, and an intermediate plate, which is disposed beneath the separation grid. The intermediate plate is equipped with a through-opening for the granular material, and with an aperture, which is provided beneath the intermediate plate and through which the granular material may be removed from the receptacle. The intermediate plate is disposed to be rotatable relative to the separation grid and the separation grid is disposed to be stationary relative to the receptacle.

11 Claims, 2 Drawing Sheets

DEVICE FOR DISCHARGING GRANULAR MATERIAL

BACKGROUND OF THE INVENTION

The present invention relates to a device for discharging granular material. As part of the recycling processes for plastic bottles and, in particular, for PET bottles, it is usual to comminute these bottles and subsequently to clean the comminuted individual pieces, or flakes, in order subsequently to send them for recycling. With some methods, it is necessary, as part of this recycling process, to remove the granular material from a receptacle. During this removal of the granular material, the problem of bridging of the granular material, or the wedging together of some particles of this granular material, frequently arises.

It is therefore an object of the present invention to make available a discharge base that is suitable even for granular material subject to bridging. The invention is described with reference to PET flakes from a recycling process, but it is pointed out that the invention is also suitable for other types of granular material.

SUMMARY OF THE INVENTION

A device for discharging granular material in accordance with the invention is equipped with a receptacle into which granular material may be introduced. Further provided is a separation grid, which is disposed in the receptacle, and an intermediate plate, which is disposed beneath this separation grid, wherein the intermediate plate is equipped with at least one through-opening for the granular material. Further provided beneath the intermediate plate is an aperture through which the granular material may be removed from the receptacle. In accordance with the invention, the intermediate plate is disposed to be rotatable relative to the separation grid and the separation grid is disposed to be stationary relative to the receptacle.

By means of the separation grid, the region above the intermediate plate is divided into a plurality of segments, and, by rotation of the intermediate plate, the granular material is then enabled to fall through the through-opening into the intermediate plate. Owing to the segmentation of the surface above the intermediate plate, bridging of the granular material is prevented.

The receptacle is preferably equipped with a flange facility in order that it may be flange-connected to silos, storage reservoirs, reaction tanks, or similar. To be more precise, the entire device is preferably flange-connected to the bottom of silos, storage reservoirs, reaction tanks or similar, wherein these silos may be of a cylindrical, conical-bottom, conical-roof or polygonal design. The device thus comprises a dual-chamber system, wherein one chamber is disposed above the intermediate plate, and the other chamber is disposed beneath the intermediate plate. The upper region, i.e. the region above the intermediate plate, serves as a storage chamber and also contains the stationary separation grid (also designated the discharge grid). Located beneath the intermediate plate is the discharge chamber. From this region, the granular material is discharged from the device and thereby from the silo, and preferably sent to a further unit or to other transportation systems, such as conveyor belts or trucks. To be more precise, the aperture provided beneath the intermediate plate serves for discharging the granular material.

In an advantageous embodiment, a base plate, which is stationary relative to the receptacle, is provided beneath the intermediate plate, and the aperture is disposed in this base plate. In operation, the granular material can thus fall through the through-opening in the intermediate plate and onto the base plate.

Preferably provided above the base plate for this purpose is a displacement apparatus, which is rotatable relative to the receptacle and which moves the granular material relative to the base plate. To be more precise, in this discharge chamber, i.e. the region above the base plate, the granular material is discharged via the aperture or pipework by means of a rotating scraper.

By means of this embodiment, the discharge base in accordance with the invention is suitable for granular material of all kinds. Even problematic granular material with a tendency to bridging can be more uniformly discharged by this discharge means.

The displacement apparatus is preferably equipped with a curvature matched to an aperture-cross-section of the aperture in the base plate. This is to be interpreted to mean that the displacement apparatus, or scraper, is curved in a manner such that the granular material is forced into the particular radial region of the base plate in which the aperture is also located. To be more precise, on movement of the displacement apparatus, the granular material is forced into a region of the displacement apparatus that forms a recess in the direction of rotation. Also provided in this region is the aperture in the base plate. Depending on the application, however, the scraper may also be straight or may exhibit a negative curvature.

The through-opening is preferably a slot extending in a radial direction of the intermediate plate. In a further advantageous embodiment, a plurality of slots of this kind may also be provided. The provision of these slots enables an extremely uniform discharging of the granular material. The through-opening preferably essentially extends along essentially the entire radial length of the intermediate plate, so that the granular material can pass through the intermediate plate in the entire radial region. To increase stability, lugs which join together the edges of the slots may also be provided.

In the event that a plurality of through-openings of this kind in the form of slots are provided, it is especially preferred if these are distributed essentially uniformly relative to one another in the peripheral direction.

Before the through-opening in the direction of rotation, the intermediate plate is equipped, in the case of a further advantageous embodiment, with an oblique surface, which preferably conceals the through-opening located beneath this oblique surface. As already mentioned, the rotating intermediate plate may be equipped with one or more discharge slots. In this manner, the direct slippage of the granular material through the intermediate plate is prevented, and during the rotation of the intermediate plate, this oblique surface serves to compact the granular material immediately before the oblique surface or ramp, so that material compressed in this manner is pressure-relieved after the ramp and falls through the intermediate plate into the discharge chamber. The oblique surface or ramp is preferably inclined between 20° and 30° relative to the plane of the intermediate plate.

The quantity and shape of these discharge slots or through-openings are matched to the granular material, and closely related to the overall base area of the device. The separation grid thus preferably comprises surfaces installed in a perpendicular alignment, i.e. panels located perpendicular relative to the intermediate plate, along with the discharge base disposed beneath.

The device is preferably equipped with an actuating apparatus, which actuates the intermediate plate, and this actuating apparatus is provided beneath the receptacle. Depending on sealing materials, it is possible in this manner to achieve even high process temperatures of up to 260° to 300°. With this embodiment, applications relating to either vacuum or positive pressure are conceivable. The intermediate plate rotates at a rate between 1 rpm and 10 rpm, preferably between 1 rpm and 7 rpm and—especially in the case of industrial-scale applications—between 1 rpm and 3 rpm. The drive motor is preferably frequency-regulated.

In the case of a further advantageous embodiment, the separation grid is equipped with between three and twelve arms, between four and ten being preferred and between four and eight being especially preferred, which arms extend in the radial direction of the intermediate plate. These arms or perpendicular panels, disposed radially, preferably taper towards the top in order to prevent any bridging. The smaller the quantity of these arms or panels, the greater the tendency towards reverse-mixing of the granular material. The greater the quantity of these arms or panels, however, the greater the risk of bridging in the device. The spacing of these arms is thus preferably matched to the granular material, and in this manner any mastication or pulping of the granular material or the co-rotation thereof is prevented, thereby conserving the product. It is further possible to dispose the arms obliquely relative to the intermediate plate.

The separation grid is preferably disposed at a distance from the intermediate plate. The emptying of the intermediate plate thus takes place by scraping, and in this manner, the core flow is minimised. It is also possible to arrange the removal of the granular material from the receptacle by the first-in-first-out principle. Use for all types of time-controlled processes in reactors is also conceivable. The distance between the arms and the intermediate plate is preferably between 10 mm and 20 mm.

In the case of a further advantageous embodiment, the device is equipped with a conical distributing element which is centrally disposed above the intermediate plate. It is especially preferred for this conical element to be disposed in a manner such that its axis of symmetry coincides with the axis of symmetry of the intermediate plate. This cone enables the virtually complete emptying of the silo, which is advantageous, in particular, in processes in which product changes are necessary. This conical element preferably rotates jointly with the intermediate plate.

The storage chamber, which is formed above the intermediate plate, thus comprises a tube, which is preferably cylindrical, the above-mentioned separation grid, the above-mentioned conical element and the rotating intermediate plate.

The present invention is further directed at a method for discharging granular material from a receptacle, wherein, in a first step, the granular material is introduced into the receptacle, e.g. from a silo, and, more precisely, the granular material is introduced from above onto an intermediate plate, which rotates relative to a separation grid, which is disposed above the intermediate plate. The granular material is then carried through at least one aperture provided in the intermediate plate. The granular material is then discharged from the receptacle through an aperture provided beneath the intermediate plate. In accordance with the invention, the separation grid is stationary relative to the receptacle, and the intermediate plate moves relative to the receptacle, and, in particular, the intermediate plate rotates relative to the receptacle.

Below the intermediate plate, the granular material preferably falls onto a base plate.

In the case of a further preferred method, using a displacement apparatus, the granular material is displaced relative to the base plate and, by means of this displacement, is finally discharged from the device.

Further advantages and embodiments may be derived from the attached drawings.

DETAILED DESCRIPTION

Figure 1:
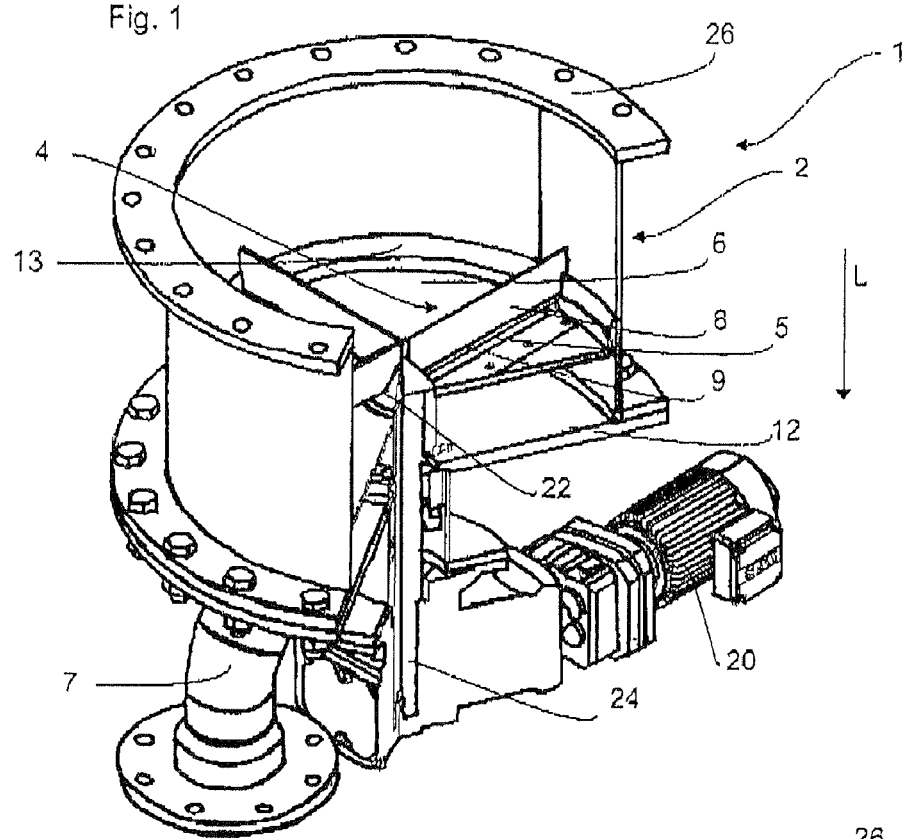
FIG. 1 shows a first, partially-sectional view of a device in accordance with the invention.

FIG. 1 shows a perspective view of a device 1 in accordance with the invention. This device is equipped with a receptacle 2, which can be flange-mounted by means of a flange 26 on a silo (not shown), e.g. on an underside of such a silo.

Provided inside the receptacle 2 is a separation grid, designated in its entirety as 4, which, in the version shown in FIG. 1, is equipped with four arms (or perpendicular panels) 8 extending in a radial direction. This separation grid is disposed so as to be stationary relative to the receptacle 2. Reference number 13 refers to a funnel-shaped edge, which, along with the separation grid 4, is also disposed to be stationary. Provided below the separation grid 4 is an intermediate plate 6, which is disposed to be rotatable within the receptacle 2. The separation grid 4 is here disposed in a manner such that the individual arms do not directly contact the intermediate plate 6, but are disposed slightly above the intermediate plate.

In this manner, the discharging of the granular material can take place in a "scraping manner". Provided in the intermediate plate 6 is a through-opening 5 in the form of a slot extending in the radial direction. The intermediate plate 6 is further equipped with an oblique surface 9, which conceals the through-opening 5 located beneath in the perpendicular direction L. This oblique surface is located before the through-opening in the direction of rotation of the intermediate plate. In the case of the embodiment shown in FIG. 1, the intermediate plate 6 therefore rotates anti-clockwise. The intermediate plate 6 is actuated by means of a motor 20 via a shaft 24.

Provided beneath the intermediate plate is a base plate 12, which again is disposed to be stationary. This base plate 12, which is preferably made from high-grade steel, is equipped with an aperture (not shown in FIG. 1), via which the granular material can be discharged through a discharge pipe 7. Further provided between the intermediate plate 6 and the base plate 12, and disposed above the base plate 12 is a displacement apparatus, which displaces the granular material that has fallen through the through-opening 5 relative to the base plate 12 until it can exit through the outlet aperture provided in the base plate 12.

The space beneath the intermediate plate 6 thereby forms a discharge chamber 30 for the granular material, and the space above the intermediate plate 6 forms a storage chamber 28. The device 1 is here dimensioned such that the storage chamber 28 exhibits a greater volume than the discharge chamber 30 disposed beneath the intermediate plate 6.

Figure 2:
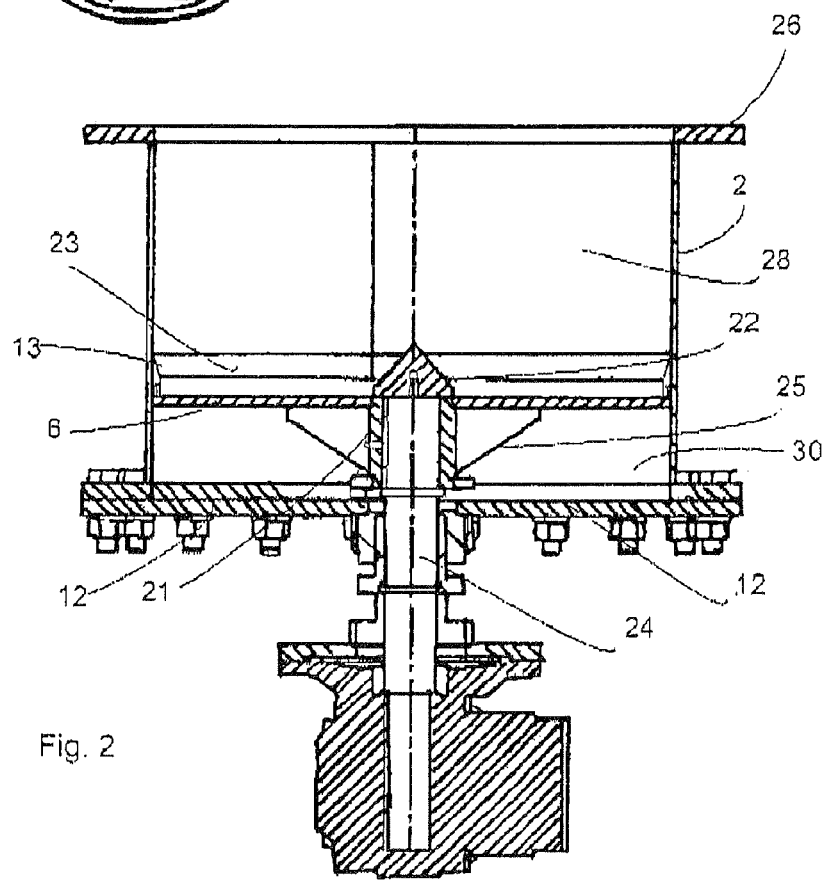
FIG. 2 shows a cross-sectional view of the device shown in FIG. 1.

FIG. 2 shows a cross-sectional view of the device shown in FIG. 1. It can be seen here that disposed above the intermediate plate 6 is a conical element 22, which here rotates jointly with the intermediate plate 6 and enables the complete emptying of the silo. Further provided between the intermediate plate 6 and the base plate 12 are a drive sleeve 21 and supports 25, which rotatably support the intermediate plate 12. In the case of the method in accordance with the invention, it would, for example, be possible to introduce batches with a predetermined weight onto the discharge base or into the receptacle. In the radial direction, the through-opening 5 exhibits a width between 3 mm and 20 mm, between 5 mm and 16 mm being preferred and between 6 mm and 12 mm being especially preferred.

The quantity of arms 8 to be selected depends inter alia on the nature of the specific granular material. The advantage of fewer arms, e.g. the four arms 8 shown in FIG. 1, lies in the fact that less granular material or fewer flakes will lie on the grid or the arms 8 themselves, and also that fewer components are necessary. However, the risk of reverse-mixing is increased in this case. The provision of a greater quantity of arms 8 reduces the risk of reverse-mixing but the outlay is increased by the necessary parts.

Because of the geometry of the discharge means, any restriction on the perpendicular, uniform mobility of the granular material in the silo can be counteracted.

The storage chamber 28 provided above the intermediate plate 6 is separated from the discharge chamber provided beneath the intermediate plate 6 by means of a sealing device, a labyrinth seal being especially preferred. Any direct falling-through of granular material outside of the through-opening 5 is prevented by this seal. As already mentioned, the region or funnel-shaped edge 13 serves for the deflection of the granular material and thereby for the prevention of bridging.

Figure 3:
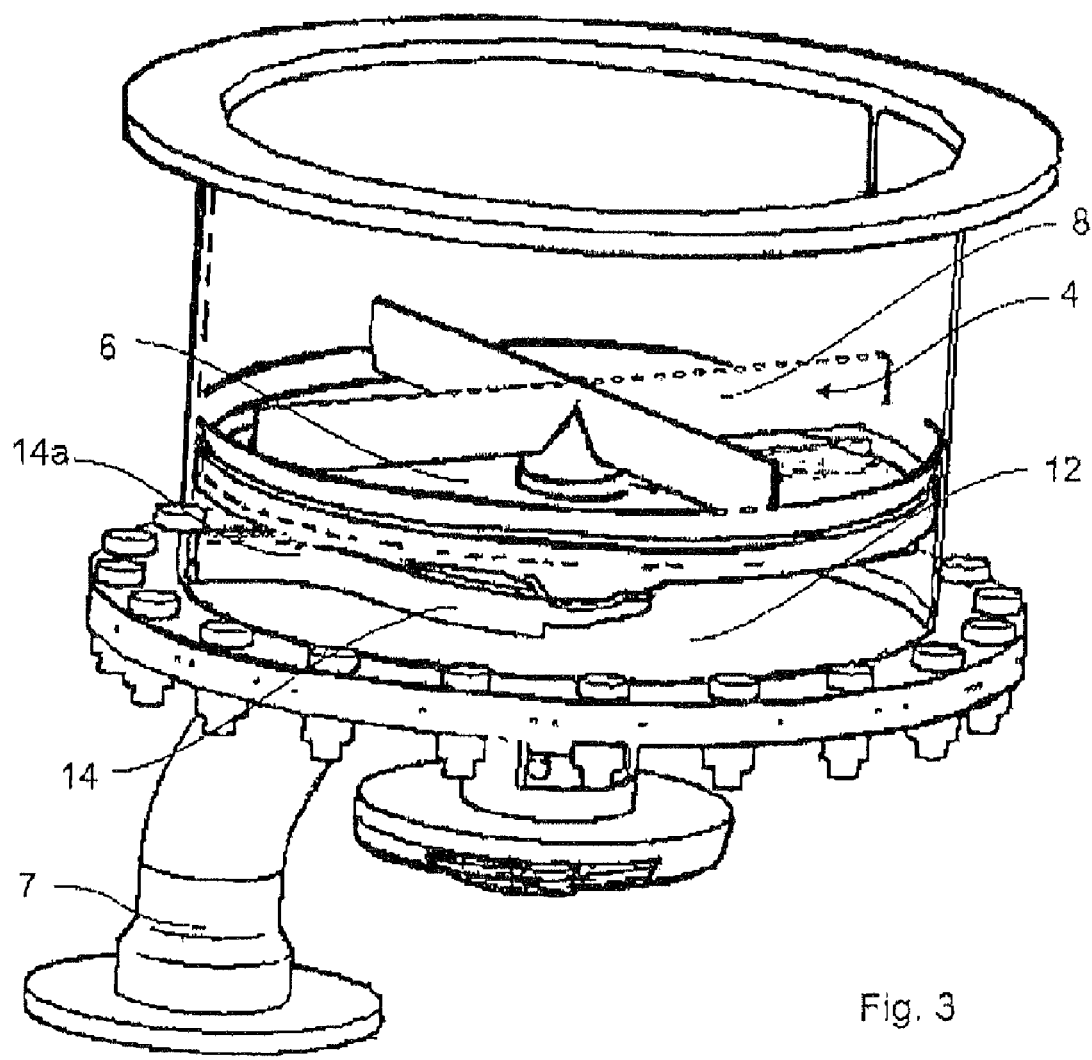
FIG. 3 shows a further, perspective view of the device shown in FIG. 1.

FIG. 3 shows a further view of a device in accordance with the invention. Seen here is the displacement apparatus 14, which is disposed below the intermediate plate 6 but above the base plate 12. This displacement apparatus rotates constantly relative to the base plate 12. The rotary motion of this displacement apparatus 14 is preferably synchronised or coupled with the rotary motion of the intermediate plate 6.

By means of this displacement apparatus 14, the granular material falling through onto the base plate 12 is displaced relative to the base plate 12 and is finally forced to an outlet aperture (not shown), through which it can fall. In the case of the embodiment shown in FIG. 3, this outlet aperture is provided downstream of the displacement apparatus 14. This outlet aperture preferably exhibits a circular profile.

The displacement apparatus 14 is also spaced at least slightly apart from the base plate 12. It would, however, also be possible to provide more than one displacement apparatus of this kind. It can be seen that the displacement apparatus exhibits a curvature 14a, which is of a design such that, during the anticlockwise rotation of the displacement apparatus 14, the granular material is forced into this curvature. At a pre-defined rotary position of the displacement apparatus, the aperture in the base plate 12 lies precisely below this curvature. In this manner, an especially efficient discharging of the granular material through the base plate 12 is achieved.

To be more precise, this curvature 14a is matched to the aperture-cross-section of the discharge aperture, and the above-mentioned spacing of the displacement apparatus or scraper is again here dependent on the granular material. This spacing is preferably adjustable relative to the base plate. In this manner, any mastication or pulping of the granular material is prevented, thereby conserving the product.

In order to achieve the complete emptying of the device, additional methods of improvement could also be implemented. For example, a brush, which also rotates, could be provided above the intermediate plate 6. It would also be possible to provide rubber blades above the intermediate plate, which likewise enable complete emptying. It would also be possible to achieve complete emptying by means of a fan either above the intermediate plate or beneath the intermediate plate. It would also be possible to achieve complete emptying by means of electrostatic charging of the individual flakes.

All features disclosed in the application documents are claimed as essential for the invention to the extent that, either individually or in combination, they are novel relative to the prior art.

The invention claimed is:

1. A device for discharging granular material, comprising: a receptacle for receiving the granular material; a separation grid, disposed in the receptacle; and an intermediate plate, disposed beneath the separation grid, wherein the intermediate plate is equipped with a through-opening for the granular material, which is provided beneath the intermediate plate and through which the granular material may be removed from the receptacle, wherein the intermediate plate is disposed to be rotatable relative to the separation grid and the separation grid is disposed to be stationary relative to the receptacle, wherein a base plate, which is stationary relative to the receptacle, is provided beneath the intermediate plate, and an aperture is disposed in the base plate and wherein provided above the base plate is a displacement apparatus, which is rotatable relative to the receptacle and which displaces the granular material relative to the base plate.

2. The device according to claim 1, wherein the displacement apparatus is equipped with a curvature matched to an aperture-cross-section of the aperture.

3. The device according to claim 1, wherein the through-opening is a slot extending in a radial direction of the intermediate plate.

4. The device according to claim 1, wherein before the through-opening in the direction of rotation, the intermediate plate is equipped with an oblique surface, which conceals the through-opening located beneath the oblique surface.

5. The device according to claim 1, wherein the device is equipped with an actuating apparatus, which actuates the intermediate plate, and that this said actuating apparatus is provided beneath the receptacle.

6. The device according to claim 1, wherein the separation grid is equipped with between 3 and 12 arms, which arms extend in a radial direction of the intermediate plate.

7. The device according to claim 6, wherein the separation grid is equipped with between 4 and 10 arms.

8. The device according to claim 7, wherein the separation grid is equipped with between 4 and 8 arms.

9. The device according to claim 1, wherein the separation grid is disposed at a distance from the intermediate plate.

10. The device according to claim 1, wherein the device is equipped with a conical distributing element, which is centrally disposed above the intermediate plate.

11. A method of discharging granular material from a receptacle, comprising:
introduction of the granular material into the receptacle, wherein the granular material is introduced from above onto an intermediate plate, which rotates relative to a separation grid, which is disposed above the intermediate plate;
carriage of the granular material through at least one aperture provided in the intermediate plate;
discharging of the granular material from the receptacle through an aperture provided beneath the intermediate plate, wherein the separation grid is stationary relative to the receptacle, and the intermediate plate moves relative to the receptacle,
wherein below the intermediate plate, the granular material falls onto a base plate and is displaced relative to the base plate by a displacement apparatus, which is rotatable relative to the base plate.

* * * * *